Figure 1:
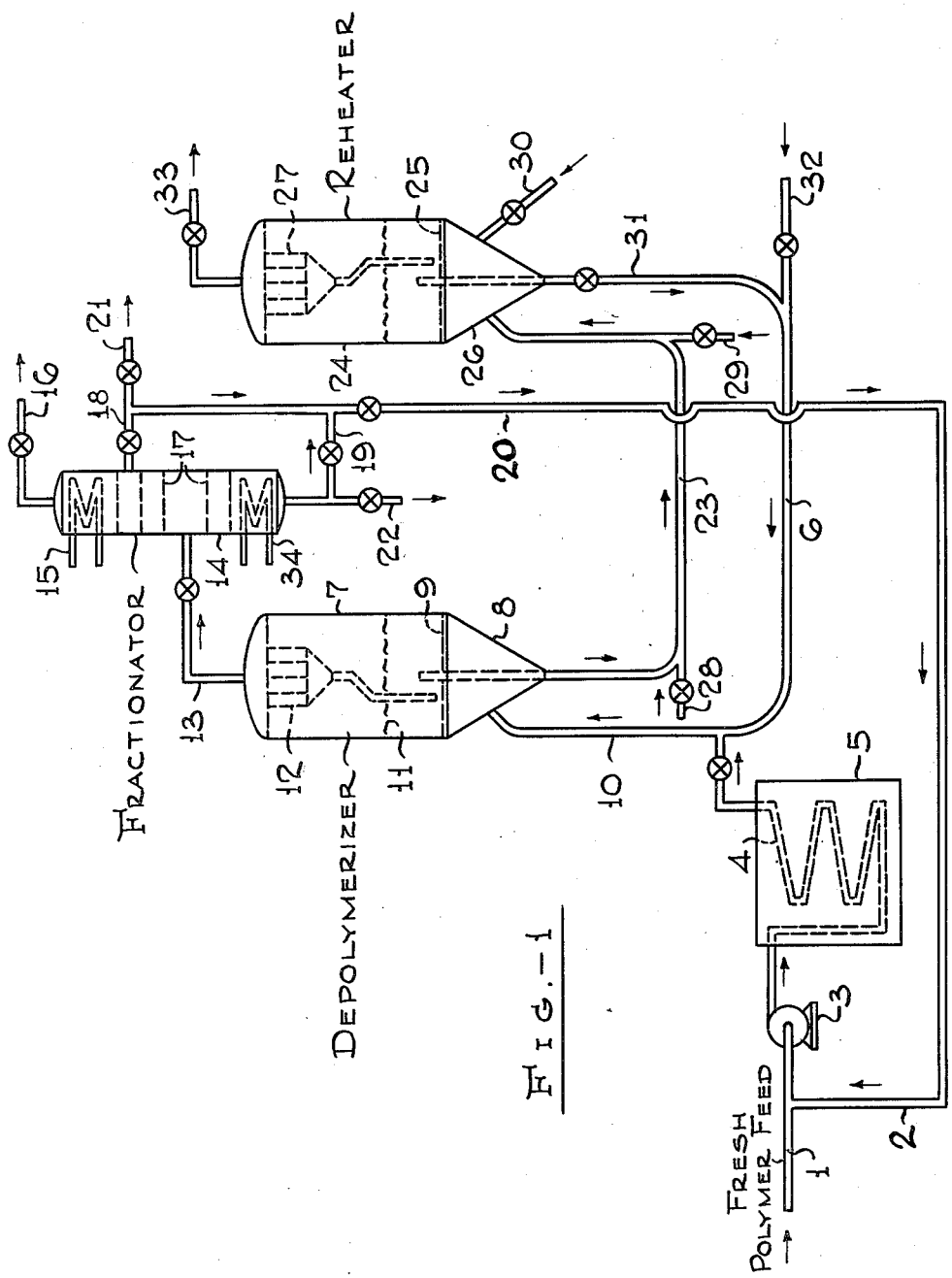

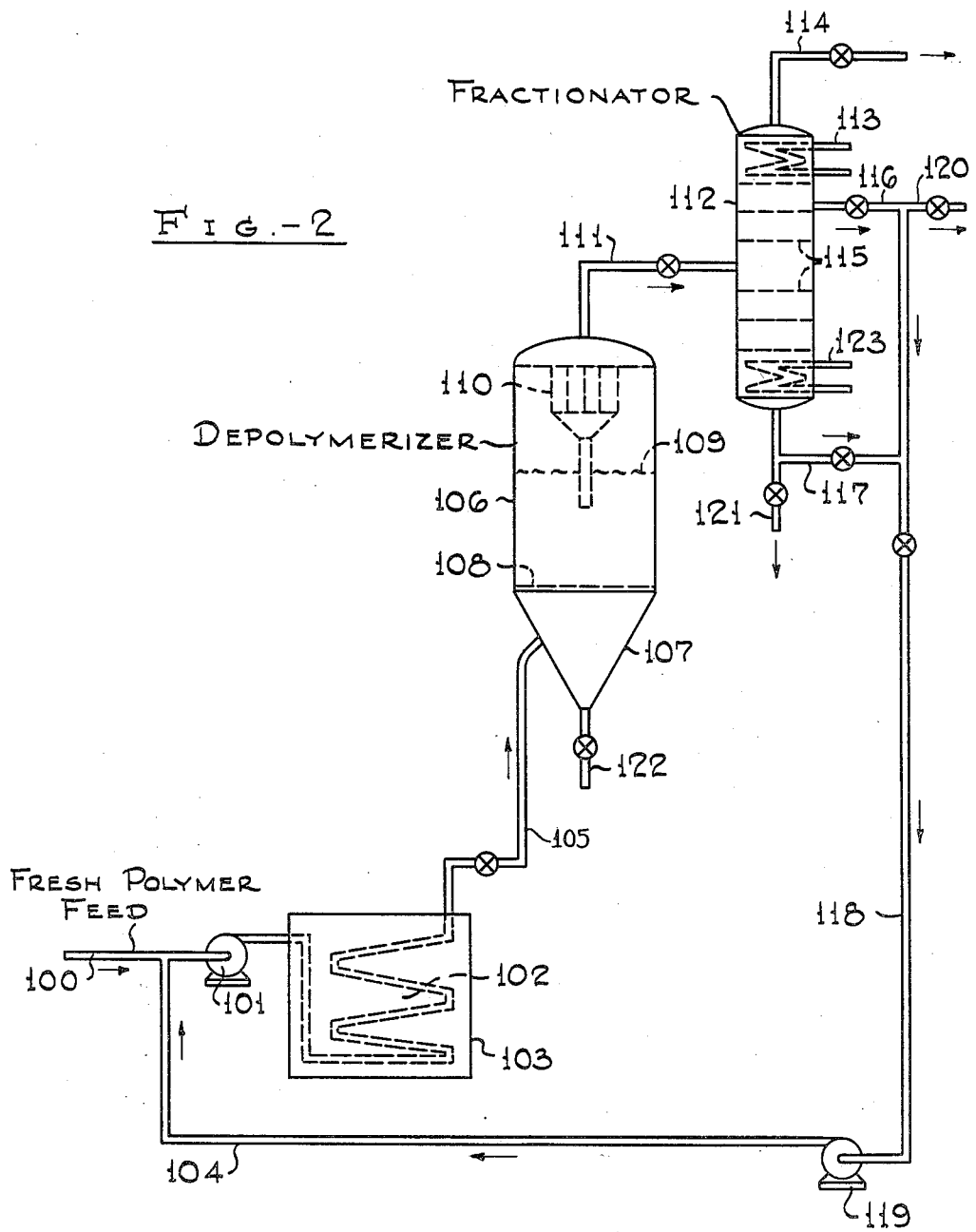

Patented July 4, 1950

2,514,332

UNITED STATES PATENT OFFICE 2,514,332

METHOD OF PRODUCING MONOMERIC OLEFINS

Eger V. Murphree, Summit, N. J., assignor to Standard Oil Development Company, a corporation of Delaware Application February 14, 1948, Serial No. 8,447

5 Claims. (Cl. 260—683)

The present invention relates to an improved process for depolymerizing olefin polymers and more specifically for obtaining the monomer from low boiling polymers of the tertiary olefin isobutylene with a minimum of undesired cracking and of undesired isomerization. The invention will be fully understood from the following description and accompanying drawings.

In the drawings, Fig. 1 shows in diagrammatic form an apparatus adapted to the continuous depolymerization of isobutylene polymers and indicates the flow of materials.

Fig. 2 shows diagrammatically another embodiment of the inventoin.

It is frequently desired to depolymerize certain olefin polymers and to recover the olefins in the form of their monomers. This may be a step in the purification of the olefin or it may be a step used when the polymerization is unintentionally brought about. In any event, it is desirable to conduct the depolymerization smoothly and as effectively as possible with the least amount of cracking. The term depolymerization indicates a smooth clean reversal of the polymerization reaction for splitting off the monomeric units, while cracking refers to the irreversible reaction in which hydrocarbon species other than the monomer are formed in substantial amounts as well as gaseous by-products, e. g., hydrogen and methane, tar, and coke.

Heretofore, depolymerization has been carried out by heating the polymers in an externally heated tube to the depolymerization reaction temperature. In some instances the preheated polymers were contacted with catalysts. In such processes it has been difficult to maintain a high yield of monomer and it has been difficult to avoid contamination of the monomer product by isomerized species. Tar and coke are formed by cracking in the heating tube and also on the catalyst if the heat required for high conversion is supplied through the tube and if the catalyst becomes heated to a cracking temperature. Thus, in such processes, continuous high yields are not obtained, the product does not have the purity desired, and material losses are sustained.

It has been found, as a basis for the present invention, that the depolymerization process can be greatly improved by restricting the temperature to which the polymer reactants are heated and by supplying heat for the reaction in the form of sensible heat carried into the reaction zone by isomeric polymers or copolymers that are less reactive at the restricted reaction temperatures maintained in the reaction zone.

By the term butylene copolymers is meant codimer and cotrimer which may be formed by copolymerization of isobutylene with normal butylenes or by isomerization of the butylene polymers, which tends to occur to a limited extent during the depolymerization. The isobutylene dimers boil at 212–221° F., the isobutylene trimers boil at 338–356° F., the codimers intermediate the dimers and trimers and the cotrimers boil at 356–374° F.

Some of the required endothermic heat of the depolymerization may be supplied in the form of sensible heat carried by a fluidized catalyst but it is important not to risk overheating the catalyst so that it has a cracking temperature when it contacts the reactive polymers. By fluidized is meant that the solid catalyst in a finely divided or powdered form is suspended in a carrier gas or vapors to form a dense suspension which will flow through conduits much like a liquid, exhibiting both static and dynamic heads.

By means of the technique employed according to the present invention, it is possible to control the reaction temperature to a remarkable degree and supply the requisite heat of reaction for high conversion. The result is that the yield of monomer is maintained at a high level up to 100% of theoretical with a minimum of cracking, i. e., with better selectivity. The whole reaction is smooth and subject to close regulation.

Referring to the drawing in more detail, Fig. 1, numeral 1 denotes the feed tube through which the reactant polymer is fed to the reaction system. This polymer is ordinarily a liquid, volatile hydrocarbon polymer fraction, for example, a fraction composed of dimers and/or trimers of isobutylene which boil in the range 212–356° F.

The fresh polymer feed from tube 1 is brought into admixture with 10–60% by volume of hot recycle polymer which is introduced through a line 2. The stream of the mixed polymers is forced by pump 3 through a heating tube 4 which is immersed in a uniform temperature heating medium, as for example, molten lead, contained within heating vessel 5.

After being heated to temperatures at which the mixed polymers are vaporized completely, as for example, to a temperature in the range of 500° F. to 800° F., the resulting vapors pass from the heating tube 4 into confluence with a fluidized stream of powdered depolymerizing catalyst which flows through line 6. The powdered catalyst may be at a temperature somewhat above that of the polymer vapors to quickly raise the temperature of the vapors to a maximum reaction temperature, but the maximum temperatures of the vapors and of the catalyst should not exceed 800° F.

The suspension of the powdered catalyst carried by the polymer vapors enters the reaction vessel 7 which has the form of a vertical cylinder fitted with a conical bottom 8. A grid or screen 9 placed in the lower part of the vessel 7 above the inlet 10 of the vaporized feed carrying the suspension helps to distribute the incoming material. The suspended catalyst and vapors within the reaction vessel 7 swirl turbulently around, giving the appearance of a boiling liquid even to the point that there is an upper level 11 for the dense suspension as shown in the drawing.

A dust separator 12, preferably of the cyclone or centrifugal type, is placed in the upper portion of vessel 7 so that the vapors leaving the vessel by pipe 13 are substantially free of catalyst dust particles. These vapors are rich in the monomer but also contain some unreacted polymer of isobutylene and some of the copolymer or isomerized isobutylene polymers which have been found to be difficult to decompose under the prevailing conditions set forth. These vapors are passed into a fractionating tower 14 which is fitted with a refluxing cooling coil 15 at the top and an overhead vapor withdrawal pipe 16 through which the isobutylene monomer is taken off for recovery by condensation. The undecomposed polymers, which can be utilized further, are collected on the various plates 17 in the fractionator 14 and at the bottom of the fractionator 14. These polymer condensates may be withdrawn as a side stream through pipe 18 and through line 19 to be returned through line 20 to line 2. Some of the fractionally condensed polymers from fractionator 14 may be removed from the system through lines 21 and 22. A heating coil 34 provides reboiling. If any catalyst particles collect in the fractionator condensates they may be removed by filtration.

The powdered catalyst within the reaction vessel 7 is, as stated, in a fluidized condition and it may be withdrawn by the pipe 23 for transfer therethrough into a reheater 24. This reheater may be similar in most respects to the depolymerizing reaction vessel 7, including a distributor screen 25 above a conical bottom 26 and a dust separator 27 near the top of the cylindrical vessel 24. A carrier gas such as steam is injected through tube 28 into the transfer line 23 to aid the flow of the fluidized catalyst toward the reheater 24. Fuel gas, such as refinery gas or natural gas, is injected into the transfer line 23 from line 29 for combustion in the reheater vessel 24, into which air is passed from line 30 to support combustion. The fuel introduced into the reheater 24 is burned directly in the presence of the powdered catalyst which is maintained in a fluidized condition in the reheater 24. In this manner, the powdered catalyst is reheated and freed of any carbonaceous deposits, then is ready for return through pipe 31 to line 6. Steam may be injected into the return line 6 from pipe 32 to aid in conveying the recycled powdered catalyst in a fluidized condition. Gaseous products of combustion are removed by the pipe 33 from vessel 24 after these gases have been freed of dust in the dust separator 27.

If desired, hot products of combustion may be obtained in a separate chamber and the hot combustion gases fed to the reheating chamber 19, as, for example, through pipe 30 for imparting heat to the catalyst in the reheater vessel 24. The temperature of the hot gases produced in vessel 24 is controlled to prevent overheating the catalyst and to prevent deterioration of any catalyst which is sensitive to the effects of elevated temperatures.

With reference to Fig. 2, the fresh polymer is fed from pipe 100 by pump 101 through a heating tube 102, located in a uniform temperature heating medium, as for example, molten lead, contained within heating vessel 103. Hot recycle polymer is admixed from pipe 104 with the fresh polymer passed through the heating tube 102 in a proportion of about 10 to 60% by volume.

After the mixed polymers are vaporized and heated to the desired reaction temperature in the range of 500° F. to 800° F., the resulting vapors pass from the heating tube 102 through line 105 into the depolymerizing vessel 106.

The reaction vessel 106 has the form of a vertical cylinder fitted with a conical bottom 107 and has a grid or screen 108 above the vapor feed inlet from pipe 105. Powdered catalyst is maintained in a dense turbulent suspension above the grid or screen 108 and up to a predetermined upper level 109.

A dust separator 110 of the centrifugal type is disclosed in the upper portion of vessel 106 to free the vapor products leaving the vessel by pipe 111 of catalyst dust particles. This vapor product is rich not only in isobutylene monomers, but contains some unreacted polymer of isobutylene and some copolymers or isomerized isobutylene polymers which did not undergo decomposition under the prevailing conditions set forth. This vapor product is passed by line 111 into the fractionating tower 112, which is fitted with a refluxing cooling coil 113 at the top and an overhead vapor withdrawal line 114, through which the isobutylene monomer is taken off for recovery by condensation. Reboiling of the bottoms in tower 112 is obtained by providing heating coil 123.

The undecomposed polymers which can be utilized further are collected on various plates 115 in the fractionating tower and at the bottom of the fractionating tower 112 as condensates and bottoms. These polymer condensates and bottoms may be withdrawn through pipes 116 and 117 for recycling by line 118 and pump 119 to line 104. Some of the polymer condensates and bottoms may be removed from the system through lines 120 and 121. If any catalyst particles collect in the polymer condensates and bottoms, they may be removed by filtration. Pipe 122 is provided at the bottom of the reaction vessel 106 to remove catalyst when the unit is shut down.

In carrying out the process, the fresh polymer is fed either as a liquid or a vapor to the heating tube to be heated to a temperature that does not exceed 800° F. A heating medium that has a uniform temperature, such as a molten lead bath, insures that the isobutylene polymers being heated do not undergo undesired thermal-decomposition, which would give rise to the undesired cracking reaction impurities. Various types of heating media may be employed, such as diphenyl ether, high temperature steam, or combustion products for heating the polymer indirectly. Direct radiant heating of these tubes is avoided to avoid non-uniform heating.

In the apparatus shown diagrammatically in Fig. 1, the bulk of the catalyst is maintained in the dense suspension mass within the reaction vessel 7, and a minor portion of this catalyst is withdrawn continuously for reheating in the reheating vessel 24.

The type of catalyst used in the process has a long life if the operation is properly carried out; for example, a catalyst such as Attapulgus clay and similar activated clays have a catalyst life of over 100 hours. To maintain the long life of the catalyst, the polymers must be prevented from contacting with the catalyst at temperatures below 500° F. or at temperatures above 800° F. At temperatures below 500° F. a polymerization reaction takes place which results in carbon deposition and at temperatures above 800° F., carbon deposition takes place as a result of cracking. Accordingly, it is important that the polymer feed be preheated to a temperature between 500° and 800° F. when it is brought into admixture with the catalyst and that the catalyst be heated to a temperature in the same range.

The butylene copolymers, which may be supplied to the intial feed from any source such as a hot acid polymerization of mixed butylenes or in the recycled condensate, as described, serves to improve the operation in two ways. These copolymers have been proved to be resistant to depolymerization and cracking under the conditions that have been set forth to be used in the depolymerization of the isobutylene polymers. Therefore, the butylene copolymers can be used to dilute the isobutylene polymers so that during the preheating step, there is less danger of overheating of the isobutylene polymers. Since the temperature of the polymer feed is one of the limiting factors in determining the activity of the catalyst and the selectivity of the depolymerization, it is important to supply additional heat to the depolymerization zone in order to furnish the endothermic heat required for the conversion of the isobutylene polymers, and the copolymers heated to the reaction temperature are capable of supplying this heat when used in suitable proportions. The heat capacity of the isobutylene polymers is of the order of 0.67 B. t. u. per pound in the reaction temperatures and it has been determined that this low heat capacity of the reactant is sufficient to give a conversion of only about 35%. Thus, the additional heat must be supplied to the reaction zone and preferably in an adiabatic manner (i. e., directly by the charged preheated feed materials instead of by indirect heat exchange with surroundings) and that is why supplying most of the heat required in the form of sensible heat carried by the copolymers which dilute the reactive polymers is important. It is, however, desirable to restrict the amount of copolymer because when the feed contains over 60% of the copolymer, there is a tendency for the product to become lowered in purity. The preferred proportion of the copolymer is in the range of 10% to 60% by volume based on the total feed.

It will be understood that the higher the reaction temperature within the prescribed range of 500° F. to 800° F., the shorter the time required for the depolymerization reaction; and that the greater the amount of catalyst and the greater its activity, the less time is required. These factors may be balanced without any difficulty so as to give a yield upwards of 75% of the isobutylene monomer having the desired purity which is above 97%. As the temperature is raised to 800° F., the feed rate has to be increased to avoid excessive lowering in the purity of the product. At feed rates below 3.84 liquid volumes per volume of catalyst per hour the conversion is dependent only on the temperature. In general, the feed rates are of the order of 1.0 to 4 liquid volumes of the polymers per volume of catalyst per hour.

In previous years isobutylene monomer of 90–95% purity was quite satisfactory for the manufacture of various commercial high molecular weight polybutenes; however, with the development of isobutylene-diene copolymers of the synthetic rubber type it was found important to have the isobutylene meet minimum specification requirements of at least 97% purity. Consequently, investigations on which this invention is based were undertaken to determine the feasibility of preparing the high purity isobutylene.

An example of favorable operating conditions employed in accordance with the present invention is set forth as follows:

| | |
|---|---|
| Pressure, p. s. i. | 100 |
| Reaction zone temps. °F | 600–650 |
| Feed rates, v./v./hr.: | |
| Fresh polymer | 2.41 |
| Copolymer | .59 |
| Wt. per cent conversion on fresh feed | 96.6 |
| Gas analysis: | |
| Propane | 0 |
| Isobutylene | 98.7 |
| n-Butylene | 0.3 |
| n-Butane | 1.0 |

When similar conditions are used without obtaining proper adiabatic conditions in a once-through process that does not dilute the fresh polymer with refractory copolymers, the temperature gradients from the reactor wall to various parts of the reaction range from 53° F. to 190° F. and the heat input is far from sufficient for conversion above 65% or for giving a product purity above 95%.

Other comparative runs are shown in the following table:

*Polymer feed containing 14% copolymer Attapulgus clay catalyst*

| Cat. inlet temp. °F | 509 | 525 | 648 | 701 | 730 | 802 |
|---|---|---|---|---|---|---|
| Isobutylene product purity | 94.4 | 97.1 | 97.9 | 97.7 | 97.4 | 95.5 |

The above data indicates that excellent product purity was obtained at temperatures below 800° F. even though 14% copolymer was present and the ratio of recycle to fresh feed was about 1 to 9. With proper adiabatic conditions the temperature gradient in between the inlet and middle of the reaction was restricted to less than 10° F.

From numerous tests that have been made it has been proved that the butylene copolymers used to dilute the fresh isobutylene polymer feed in preheating do not have an adverse effect on the purity of the product. This is quite an unexpected discovery, considering the close similarity that the polymers and copolymers have in composition since both are isomeric $C_8$ and $C_{12}$ olefins.

In the depolymerization operation pressures ranging upwardly from about atmospheric pressure may be used but it is preferred that the pressure be of the order of 10 to 100 pounds per square inch gauge.

In the process carried out with apparatus illustrated in Fig. 2, the heat for the reaction is supplied by the fresh feed polymers and by the recirculated polymers which is composed largely of butylene copolymers while the catalyst remains within the depolymerization reaction vessel. The fluidized powdered catalyst, which remains in the reaction zone, acts as a temperature modifying medium and rapidly levels the temperature throughout the reaction zone so as to prevent localized hot spots which are a cause of poor selectivity and resultant formation of impurities. The temperature in the reaction zone may vary from point to point by less than 5 or 10° F. when the operation is carried out as described. If a fixed catalyst is used in the reaction zone, the catalyst becomes deactivated first at the point where the feed enters the catalyst bed, the hot spots develop, the conversion lacks uniformity and the catalyst life becomes shortened.

Although it has been indicated that some part of the heat may be supplied to the reaction zone by the circulated catalyst in a process carried out as shown in Fig. 1 while the remaining part of the heat of reaction is supplied by the fresh feed polymer and the copolymer diluent, the most advantageous method of supplying most of the heat is through the copolymers in order to avoid the risk of overheating the catalyst and since only a moderate amount of heat has to be supplied through the heating tube to the polymers.

The powdered catalyst is employed in a fluidized form by being suspended in the polymer vapors or also in a carrier gas, preferably steam. In the depolymerizing reaction zone the polymer vapors and the monomer product vapors serve to maintain the catalyst in suspension. In the reheater vessel the gaseous fuel, the oxygen-containing gas, and the gaseous products of combustion serve the same purpose. The powdered catalyst may be passed in a continuous cyclic path between the depolymerizer and the reheater without requiring any mechanical means such as a pump, fan, or screw conveyor to obtain the flow of the fluidized powdered catalyst. The density of the suspension may be decreased by the addition of gas or can be increased by withdrawing gas from the mixture. In using the two vessels as shown in Fig. 1, the connecting flow lines are in the form of U tubes. The gas and vapors are added to the legs of these U tubes which serve to keep the powdered material fluidized as it is propelled through the tubes. The amount of gas or vapor present in the suspension on the down stream sides of the U tubes is generally considerably less than on the upstream sides and the resulting difference in density produced thereby in the two sides is sufficient to create a pressure difference which overcomes the friction of the flow. In this way, continuous circulation is obtained.

The powdered catalyst, as indicated above, is preferably an activated clay or similar type of adsorbent silicate, for example, a synthetic magnesium silicate such as Magnesol. The preferred type of catalysts are the activated clays, such as Florida earth, bentonitic types of clays which have been acid treated, for example, with sulfuric, hydrochloric or hydrofluoric acids. Synthetic gel catalysts, especially those of silicate or those of silica admixed with magnesia or zirconia may also be employed.

It is claimed:

1. An improved process for selectively depolymerizing isobutylene polymers which are dimers and trimers to form substantially pure isobutylene monomer, which comprises introducing a feed stream of said polymers mixed with butylene copolymers preheated to a temperature between 500 and 800° F. into contact with a heated finely divided depolymerization catalyst maintained at a temperature in the same range by sensible heat of the copolymers, fluidizing said catalyst within said reaction zone so that the catalyst forms a dense suspension having a predetermined upper level, withdrawing a gaseous product stream from above said upper level of the dense suspension, freeing said gaseous product stream of catalyst particles, and fractionating from the gaseous product stream a gaseous stream composed substantially of pure isobutylene monomer.

2. The process as described in claim 1, in which the copolymers are fractionally condensed from said gaseous product stream and are returned to be admixed with the feed of fresh isobutylene polymers to form from 10% to 60% by volume of the total polymer feed which is preheated to a temperature between 500° F. and 800° F. and is contacted with the fluidized catalyst maintained at a temperature in the same range.

3. The improved process for selectively depolymerizing an isobutylene polymer boiling within the range of 212°-356° F. to form substantially pure isobutylene monomer, which comprises preheating a feed stream of said polymer to a temperature within the range of 500–800° F. simultaneously preheating isobutylene-butylene copolymers to a temperature in the range of 500–800° F., contacting mixed vapors of the thus heated isobutylene polymer and of the copolymer with a powdered depolymerizing catalyst maintained in a dense suspension by the flow of the vapors within a depolymerization zone at 500° F.–800° F., proportioning the amount of the copolymers to the polymer so that the sensible heat of copolymers furnishes most of the endothermic heat required in the depolymerization of the polymer, and withdrawing a vapor stream rich in isobutylene monomer with vapors of the copolymers that remain undecomposed.

4. A process for selectively depolymerizing isobutylene polymers which are dimers and trimers in the presence of isomeric butylene copolymers to form substantially pure isobutylene monomer, the steps which comprise preheating the isobutylene polymers in a feed stream containing 10 to 60 volume per cent of said isomeric butylene copolymers by indirect heat exchange with a uniform temperature heating medium to a temperature within the range of 500° F.–800° F. prior to contact with a depolymerization catalyst, passing resulting vapors of the thus preheated feed stream prior to decomposition of isobutylene polymers contained therein up through a dense suspension of fluidized solid catalyst maintained at a temperature in the range of 500° F.–800° F. by sensible heat of feed materials contacted with the catalyst, removing resulting isobutylene monomer and isomeric butylene copolymer vapors from said dense suspension of fluidized catalyst to a fractionating zone, fractionally condensing the isomeric butylene copolymer vapors in said fractionation zone, withdrawing isobutylene monomer vapor from said fractionating zone, returning condensate of the isomeric butylene copolymers to said feed stream for admixture therein with isobutylene polymers, passing a portion of the fluidized catalyst from said dense suspension to a reheating zone wherein carbonaceous deposits on the catalyst undergo combustion in the presence of an oxidizing gas and returning fluidized catalyst at a temperature between 500° F. and 800° F. from said reheating zone into said dense suspension.

5. The process as described in claim 4 wherein said powdered catalyst is an activated adsorbent clay.

EGER V. MURPHREE.

REFERENCES CITED

The following references are of record in the file of this patent:

UNITED STATES PATENTS

| Number | Name | Date |
|---|---|---|
| 2,196,363 | Robertson | Apr. 9, 1940 |
| 2,349,045 | Layng et al. | May 16, 1944 |
| 2,361,978 | Swearingen | Nov. 7, 1944 |